United States Patent Office 3,104,261
Patented Sept. 17, 1963

3,104,261
PRODUCTION OF OXIMES
Vernon V. Young, Terre Haute, Ind., assignor to Commercial Solvents Corporation, New York, N.Y., a corporation of Maryland
No Drawing. Filed Dec. 30, 1959, Ser. No. 862,801
15 Claims. (Cl. 260—566)

My invention relates to the production of oximes, and more particularly, it relates to a process for producing oximes from primary and secondary nitroparaffins containing at least two carbon atoms in the presence of a silver oxide, zinc oxide, chromium oxide, calcium oxide reducing catalyst, whereby the by-products of the reduction are oxidized to oximes in the presence of the reducing catalyst.

Oximes have long been prepared by the partial reduction of nitroparaffins. Hydrogenation in the presence of a catalyst is one of the ways by which this reduction can be made, and such a catalytic reduction was disclosed by Grundmann in Angew. Chem., volume 62, pages 558–560 (1950). The Grundmann reference shows reduction of nitrocyclohexane to cyclohexanone oxime using various catalysts, the best catalyst being a silver oxide, zinc oxide, chromium oxide, calcium oxide catalyst. This reference states that the above catalyst seems also specific enough to be used to reduce aliphatic nitro radicals to oxime radicals. U.S. Patent 2,711,427 discloses an improved process wherein an alkaline material is employed as a promoter of the reduction. Unfortunately, this method of producing oximes from nitroparaffins also results in production of the corresponding hydroxylamine as a by-product, thus limiting the yields of oxime that can be obtained.

I have now discovered a new process for production of oximes by which I am able to obtain a greater yield than could heretofore be obtained. My new process is practical and economical on a commercial scale basis.

According to my new process, the nitroparaffin is reduced to the corresponding oxime in the presence of a silver oxide, zinc oxide, chromium oxide, calcium oxide catalyst and then the reduction mixture is oxidized in the presence of the very same unremoved catalyst. Thus, the same catalyst is used as a reduction catalyst in the reduction step of the process and as an oxidation catalyst in the oxidation step of the process. The nitroparaffins that can be used are primary and secondary nitroparaffins containing at least two carbon atoms, for example, nitroethane, 1-nitropropane, 2-nitropropane, 2-nitrobutane, nitrocyclohexane, etc. Some of the oximes that I can produce are acetaldoxime, propionaldoxime, acetoxime, methylethylketoxime, cyclohexanone oxime. Hydrogen is used as the reducing agent and the reduction is accomplished in a hydrogen atmosphere under pressure.

Temperature and pressure are influencing factors but are not critical to the process. Pressures below 300 p.s.i. slow the hydrogenation step of the process. I, therefore, use pressures above 300 p.s.i. and preferably in the range from 500 p.s.i. to 1,000 p.s.i. The temperatures I prefer to use in the hydrogenation step of the process are from about 110° C. to about 150° C.

The silver oxide, zinc oxide, chromium oxide, calcium oxide catalyst can be prepared by the process described by Grundmann in Angew. Chem., volume 62, page 560 (1950), and by Christian in U.S. Patent 2,711,427. The preparation is as follows: silver nitrate (AgNO$_3$—3.4 grams), calcium nitrate (Ca(NO$_3$)$_2$.4H$_2$O—4.7 grams) and zinc nitrate (Zn(NO$_3$)$_2$.6H$_2$O—47 grams) are dissolved in 200 milliliters of hot distilled water. A second solution containing ammonium chromate ((NH$_4$)$_2$Cr$_2$O$_7$—25.2 grams) and concentrated ammonium hydroxide (30 milliliters) in 150 milliliters of distilled water is prepared and poured as a fine stream into the first solution with vigorous stirring. The precipitate is immediately filtered, dried by means of suction, and heated in a furnace for 1.5 hours at 350°–400° C. After cooling, the product is triturated in a mortar with 2 N acetic acid and dried on a suction filter. This treatment is repeated and the product is finally washed with distilled water and dried at 100° C. No catalyst support is required; but, if desired, a carrier such as pumice, clay, alumina, kieselguhr, etc., can be used.

The catalyst described above acts as a reducing catalyst in the hydrogenation step of my new process. After the reduction, the reduction mixture is oxidized by passing either air or oxygen through the mixture while the mixture is stirred. The unremoved catalyst now acts as an oxidizing catalyst and the corresponding hydroxylamine, produced as a by-product in the reduction step of my process, is oxidized to the corresponding oxime.

The temperature of the oxidation step of my process is not critical to the process. I prefer to use temperatures of about 55°–60° C. during the oxidation.

In carrying out my new process, I can employ an inert organic solvent; but such use of a solvent is not absolutely necessary. Suitable solvents which I can employ include methanol, ethanol, isopropanol, ether, etc. I prefer to use methanol.

The oxime can be recovered by various methods. One method is by fractional distillation whereby the solvent, if one is used, and the remaining nitroparaffin are distilled at different temperatures and pressures than the oxime produced.

The following examples are offered to illustrate my invention; however, I do not intend to be limited to the specific materials, proportions, or procedures described. Rather, I intend to include within the scope of my invention all equivalents obvious to those skilled in the art.

*Example I*

A 5-gallon stainless steel reactor was charged with 8 pounds of nitrocyclohexane, 8 pounds of methanol, and 25 grams of silver oxide, zinc oxide, chromium oxide, calcium oxide catalyst. Hydrogen, under 500 p.s.i., was admitted and the charge heated to 135° C. The hydrogen pressure was increased to 1,000 p.s.i. and maintained throughout the reaction time of 20 hours. Following the reduction, the mixture contained 4.4% of cyclohexylamine, 4.9% of cyclohexylhydroxylamine and 18.7% cyclohexanone oxime. This was a 48.2% conversion of nitrocyclohexane to cyclohexanone oxime. The reduction mixture was then transferred to a reactor equipped with a stirrer and condenser. The charge was heated to 55°–60° C. and oxygen was passed into the stirred mixture for 8 hours until the oxidation of cyclohexylhydroxylamine was complete. The mixture now contained 3.6% of cyclohexylamine and 25.0% of cyclohexanone oxime. By oxidation of the cyclohexylhydroxylamine, the overall conversion of nitrocyclohexane to cyclohexanone oxime was 62.5%.

Cyclohexanone oxime was recovered by distillation using a 4-foot column packed with glass helices to remove the methanol. The cyclohexanone oxime concentrate was then further distilled under vacuum and collected at 10 millimeters at a vapor temperature of 80–83° C.

*Example II*

A 5-gallon stainless steel reactor was charged with 8 pounds of 2-nitropropane, 8 pounds of methanol, and 35 grams of silver oxide, zinc oxide, chromium oxide, calcium oxide catalyst. Hydrogen under 500 p.s.i. was admitted and the charge heated to 135° C. The hydrogen pressure was increased to 1,000 p.s.i. and maintained throughout the reaction time of 13½ hours. Following the reduction, the mixture contained 2.20% of N-isopropylamine, 4.90% of N-isopropylhydroxylamine and 27.90% of acetoxime. This was a 65.9% conversion of 2-nitropropane to acetoxime. The reduction mixture was then transferred to a reactor equipped with a stirrer and condenser. The charge was heated to 55°–60° C. and air passed into the stirred mixture for 12 to 14 hours until the oxidation of N-isopropylhydroxylamine was complete. The mixture now contained 2.34% of N-isopropylamine and 33.92% of acetoxime. By oxidation of the N-isopropylhydroxylamine, the overall conversion of 2-nitropropane to acetoxime was 85%.

Acetoxime was recovered by distillation, using a 2-foot column with stainless steel packing. The acetoxime concentrate was distilled under vacuum.

Now having described my invention, what I claim is:

1. In the production of oximes wherein a compound selected from the group consisting of primary and secondary nitro paraffins containing at least 2 carbon atoms is hydrogenated in the presence of a catalyst and the reaction mixture is oxygenated with an oxygenating agent selected from the group consisting of air and oxygen to produce the corresponding oxime; the improvement consisting essentially of oxygenating the reaction mixture in the presence of a zinc oxide-silver oxide-chromium oxide-calcium oxide catalyst.

2. The process of claim 1 wherein the reaction mixture is oxygenated at temperatures from about 55° to 60° C.

3. The process of claim 2 wherein the hydrogenation is effected using an inert organic solvent and a hydrogen atmosphere.

4. In a process for the production of cyclohexanone oxime wherein nitrocyclohexane is hydrogenated in the presence of a catalyst and the reaction mixture is oxygenated to produce the oxime; the improvement consisting essentially of oxygenating the reaction mixture with air in the presence of a silver oxide-zinc oxide-chromium oxide-calcium oxide catalyst at temperatures from about 55° to 60° C.

5. A process for producing oximes from the hydroxylamines of a compound selected from the group consisting of primary and secondary nitro paraffins containing at least 2 carbon atoms consisting essentially of oxygenating the hydroxylamine with an oxygenating agent selected from the group consisting of air and oxygen in the presence of a silver oxide-zinc oxide-chromium oxide-calcium oxide catalyst.

6. The process of claim 5 wherein the hydroxylamine is oxygenaated at a temperature from about 55° to 60° C.

7. The process of claim 6 wherein the hydroxylamine is cyclohexylhydroxylamine.

8. The process of claim 1 wherein the catalyst used to hydrogenate is the same as the catalyst used to oxygenate.

9. The process of claim 2 wherein the hydrogenation is effected at pressures above 300 p.s.i. and temperatures from about 110° to 150° C.

10. The process of claim 3 wherein the inert organic solvent is methanol and the pressures used in the hydrogenation range from about 500 to 1000 p.s.i.

11. The process of claim 8 wherein the paraffin is a primary nitro paraffin.

12. The process of claim 8 wherein the paraffin is a secondary nitro paraffin.

13. The process of claim 11 wherein the nitro paraffin is 2-nitropropane.

14. The process of claim 12 wherein the nitro paraffin is nitrocyclohexane.

15. The process of claim 4 wherein the catalyst used in the hydrogenation is the same catalyst used in the oxygenation.

References Cited in the file of this patent

UNITED STATES PATENTS

| | | |
|---|---|---|
| 2,711,427 | Christian | June 21, 1955 |
| 2,768,206 | Kaarsemaker | Oct. 23, 1956 |
| 2,886,596 | Meister et al. | May 12, 1959 |

OTHER REFERENCES

Berkman et al.: "Catalysis," page 657 (1940).